(12) United States Patent
Chang

(10) Patent No.: US 6,498,463 B2
(45) Date of Patent: Dec. 24, 2002

(54) BOOST CONVERTER WITH ZERO VOLTAGE MAIN SWITCH AND ZERO CURRENT AUXILIARY SWITCHES

(75) Inventor: Yu-Ming Chang, Pingien (TW)

(73) Assignee: Delta Electronics Inc., Taoyuan Shien (TW)

( * ) Notice: Subject to any disclaimer, the term of this patent is extended or adjusted under 35 U.S.C. 154(b) by 0 days.

(21) Appl. No.: 09/954,356

(22) Filed: Sep. 12, 2001

(65) Prior Publication Data

US 2002/0047693 A1 Apr. 25, 2002

(30) Foreign Application Priority Data

Oct. 23, 2000 (TW) .......................... 89122265 A

(51) Int. Cl.[7] ............................... G05F 1/10
(52) U.S. Cl. ........................ 323/222; 323/235
(58) Field of Search ................. 323/222, 235, 323/282, 225, 232, 233

(56) References Cited

U.S. PATENT DOCUMENTS 5,991,174 A  * 11/1999  Farrington et al. ......... 323/222
6,060,867 A  *  5/2000  Farrington et al. ......... 323/222
6,236,191 B1 *  5/2001  Chaffai ...................... 323/222
6,341,076 B1 *  1/2002  Kadatskyy et al. ...... 363/56.09

* cited by examiner

Primary Examiner—Shawn Riley

(57) ABSTRACT

A zero voltage, zero current switching boost converter is provided. The boost converter includes an input coupled to an input inductor, a main switch coupled to the input inductor that conducts currents through the input inductor to store energy in said input inductor, and a resonant circuit coupled to the main switch for conducting currents from the input to an output of the boost converter which includes a first series circuit of a first auxiliary switch and a second auxiliary switch coupled to the main switch, a second series circuit of a first output capacitor and a second output capacitor in parallel with the first series circuit, and a resonant inductor interposed between the first series circuit and the second series circuit that forms a first discharge loop and a second discharge loop to make the main switch turn on and off under a substantial zero voltage, wherein both the first auxiliary switch and the second auxiliary switch are turned on and off under a substantial zero current circumstance.

7 Claims, 5 Drawing Sheets

BOOST CONVERTER WITH ZERO VOLTAGE MAIN SWITCH AND ZERO CURRENT AUXILIARY SWITCHES

FIELD OF THE INVENTION

The present invention is in general related to a zero voltage, zero current switching boost converter which utilizes electronic switches to accomplish voltage boost operation.

DESCRIPTION OF THE RELATED ART

FIG. 1 illustrates a single-phase boost converter. In FIG. 1, when the main switch $S_m$ turns on, the direct current (DC) power outputted from the full-wave rectifier will start to accumulate electric energy on the boost choke L. The main diode $D_m$ is turned off at this moment. When the main switch $S_m$ turns off, the current will drop off instantaneously and the current transition rate (di/dt) of the boost choke L becomes negative. An inverse electromotive force of a magnitude of L(di/dt) is induced across the boost choke L. Thereby the main capacitor will be charged to achieve the function of voltage boost. Theoretically, the main switch $S_m$ will rapidly and periodically turn on and off so that the electric energy stored in the boost choke L is able to discharge to the main capacitor at any time. In this manner, the main capacitor can maintain a constant voltage.

However, the boost converter of FIG. 1 is disadvantageous over the situation that when the main switch $S_m$ is switching its state, the main switch $S_m$ and the main diode $D_m$ will incur a serious switching loss due to a reverse recovery current introduced by the main diode $D_m$.

FIG. 2 is an improved boost converter which is designed for obviating the foregoing disadvantages encountered by the prior art boost converter of FIG. 1. The circuit configuration of FIG. 2 principally locates a branch circuit across the circuit nodes of the main switch $S_m$ and also locates another branch circuit across the main diode $D_m$. The auxiliary inductor $L_a$ and the auxiliary switch $S_a$ on the branch circuit can be applied to eliminate the reverse recovery current of the main diode $D_m$ and preload electric energy onto the auxiliary inductor $L_a$. Then the main switch $S_m$ can be turned on under a zero voltage circumstances so that the energy stored in the auxiliary inductor $L_a$ can be discharged through the diode $D_2$ to the output capacitor when the auxiliary switch $S_a$ is turned off. Therefore the deficiency of high switching loss arising from the main diode of the boost converter of FIG. 1 can be eliminated. However, in FIG. 2, the switching loss arising from the auxiliary switch $S_a$ is still existed, and further the problems of electromagnetic interference (EMI) and radio frequency interference (RFI) still have not been addressed.

SUMMARY OF THE INVENTION

An object of the present invention is the provision of a boost converter which enables the electronic switches thereof to switch their on/off states under a zero voltage/zero current circumstances, to avoid switching loss and reduce electromagnetic interference and radio frequency interference. In addition, the switch element of the boost converter can be of a miniaturized size and the overall performance can be enhanced.

To achieve the foregoing objectives, a zero voltage, zero current switching boost converter is proposed and comprises a boost section for receiving a first direct current (DC) power and outputting a boosted second direct current power, a resonant circuit comprising a first discharge loop including a first auxiliary switch and a second discharge loop including a second auxiliary switch for permitting the first direct current power to discharge alternately through the first discharge loop and the second discharge loop to a load to generate the second direct current power, and wherein the main switch is turned on and off under a zero voltage circumstances and both the first auxiliary switch and the second auxiliary switch are turned on and off under a zero current circumstances.

According to the zero voltage, zero current switching boost converter as described hereinbefore, the boost section further comprises a boost choke, and the load comprises a first output capacitor and a second output capacitor.

The first discharge loop further comprises a resonant inductor, the second output capacitor and a second main diode. The second discharge loop further comprises a first main diode, the first output capacitor and the resonant inductor.

Remarkably, both the first auxiliary switch and the second auxiliary switch comprise a unidirectional switch. A preferable implementation for the unidirectional switch is an insulated gate bipolar transistor (IGBT) with a relatively low collector-emitter reverse-biased voltage with gate opened ($V_{CEO}$). An alternative for implementing the unidirectional switch is a silicon controlled rectifier (SCR) or an insulated gate bipolar transistor (IGBT) with a relatively high collector-emitter reverse-biased voltage with gate opened ($V_{CEO}$). If both the first auxiliary switch and the second auxiliary switch are implemented by an insulated gate bipolar transistor (IGBT) with a relatively low collector-emitter reverse-biased voltage with gate opened ($V_{CEO}$), a first auxiliary diode and a second auxiliary diode are required to respectively connect with the first auxiliary switch and the second auxiliary switch.

Now the other features and advantages of the present invention will be more clearly understood through the following descriptions with reference to the accompanying drawings, wherein:

DETAILED DESCRIPTION OF THE PREFERRED EMBODIMENT

Figure 3A:
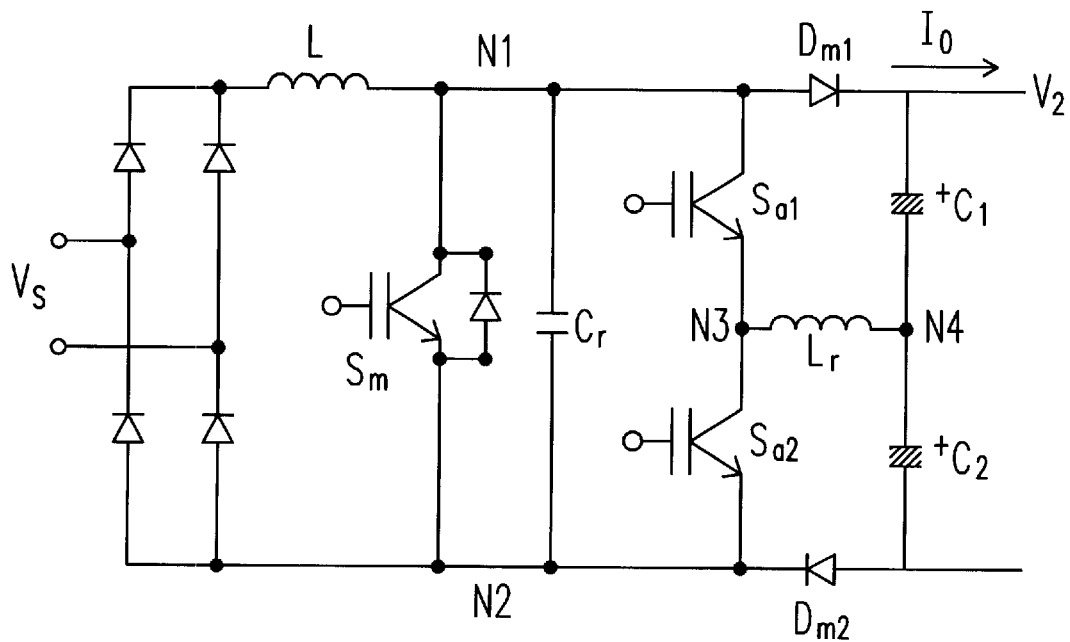
FIG. 3(a) illustrates a circuit topological view of a boost converter according to a preferred embodiment of the present invention.

FIG. 3(a) shows a circuit topological view of the boost converter according to a preferred embodiment of the present invention. The input AC voltage is rectified by a full-wave rectifier to generate a first direct voltage (DC) power, and then the first DC voltage goes through a boost section and a resonant circuit to output a second DC power $V_2$.

Figure 3B:
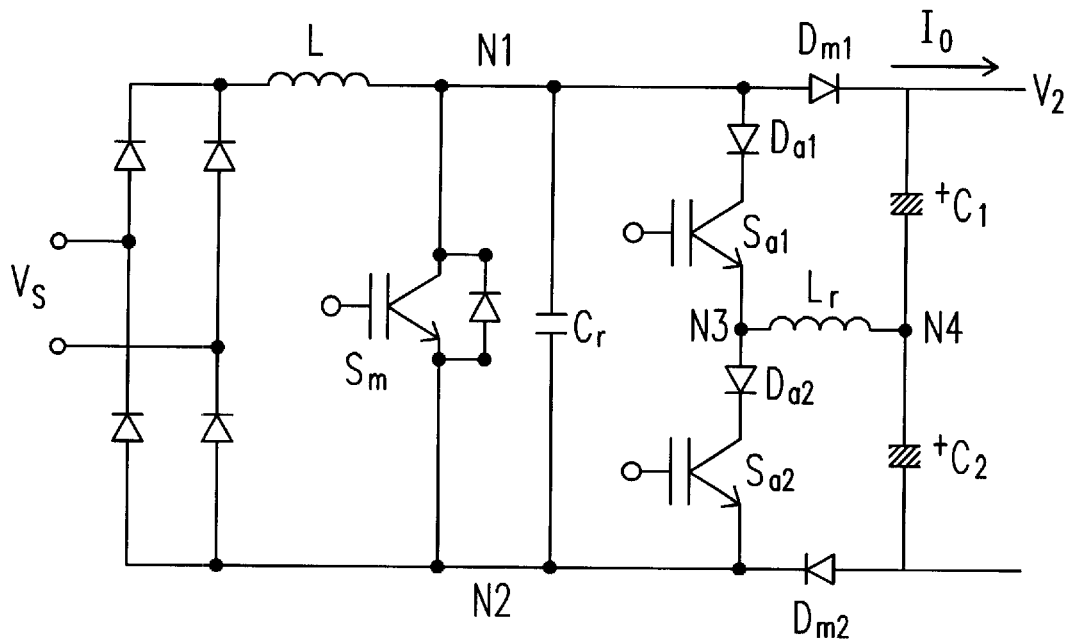
FIG. 3(b) illustrates the circuit topological view of the boost converter of FIG. 3(a), with a first auxiliary diode and a second auxiliary diode are incorporated therein.

The boost section comprises a boost choke L and a main switch $S_m$. The boost converter of FIG. 3(a) further comprises a resonant circuit including a first discharge loop and a second discharge loop for permitting the first direct current power to be alternately discharged along the first discharge loop and the second discharge loop to a load. The load comprises a first output capacitor $C_1$ and a second output capacitor $C_2$. The first discharge loop according to a preferred embodiment of the present invention is formed of a first auxiliary switch $S_{a1}$, a resonant inductor $L_r$, the second output capacitor $C_2$ and a second main diode $D_{m2}$. The second discharge loop is formed of a first main diode $D_{m1}$, the first output capacitor $C_1$, the resonant inductor $L_r$ and a second auxiliary switch $S_{a2}$. It is to be noted that both the first auxiliary switch $S_{a1}$ and the second auxiliary switch $S_{a2}$ are implemented by a unidirectional switch. If an insulated gate bipolar transistor (IGBT) with a relatively low collector-emitter reverse-biased voltage with gate opened ($V_{CEO}$) is adopted to implement both the first auxiliary switch $S_{a1}$ and the second auxiliary switch $S_{a2}$, a first auxiliary diode $D_{a1}$ and a second auxiliary diode $D_{a2}$ are required to respectively connect with the first auxiliary switch $S_{a1}$ and the second auxiliary switch $S_{a2}$, as shown in FIG. 3(b). If a silicon controlled rectifier (SCR) or an insulated gate bipolar transistor (IGBT) with a relatively high collector-emitter reverse-biased voltage with gate opened ($V_{CEO}$) is adopted to implement both the first auxiliary switch $S_{a1}$ and the second auxiliary switch $S_{a2}$, the auxiliary diode $D_{a1}$ and the second auxiliary diode $D_{a2}$ is not necessary to be incorporated into the boost converter.

Figure 4:
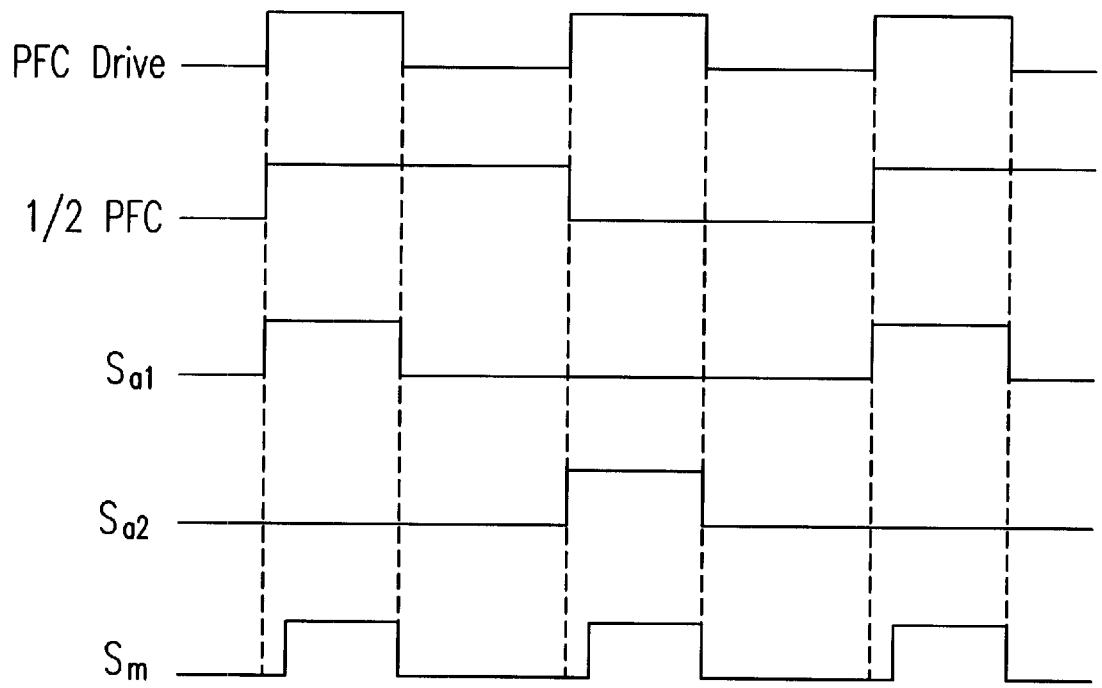
FIG. 4 exhibits a timing diagram for all the driving signals in the boost converter according to a preferred embodiment of the present invention.
Figure 5:
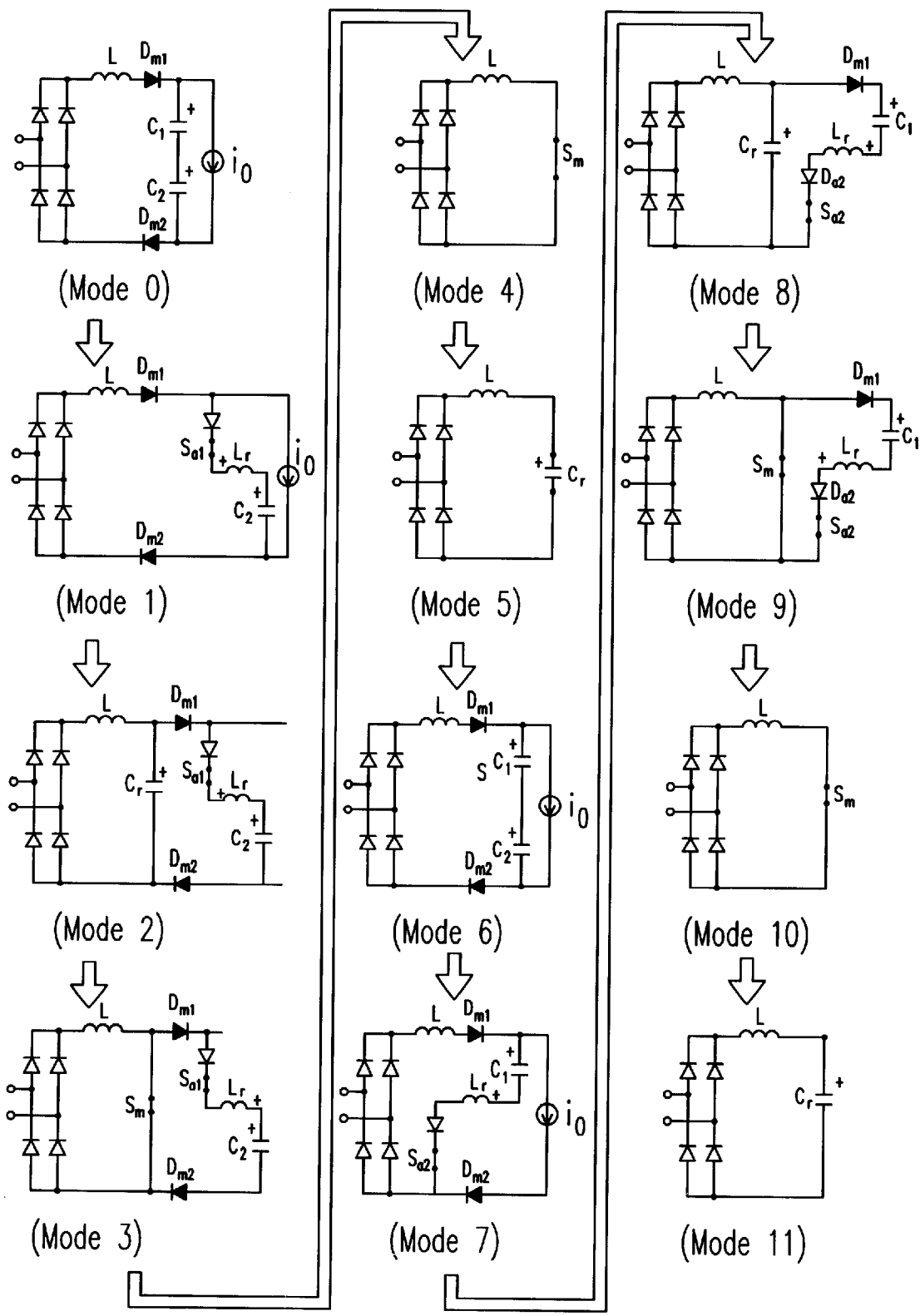
FIG. 5 demonstrates all the operating modes of the boost converter according to a preferred embodiment.

FIG. 4 exhibits a timing diagram for all the driving signals in the boost converter according to a preferred embodiment of the present invention. FIG. 5 illustrates all the operating modes of the boost converter according to a preferred embodiment of the present invention. Referring to FIG. 5, according to a preferred embodiment of the present invention, the operation of the boost converter is divided into twelve operating modes, and their operating axioms will now be described in more detail as follows.

Figure 1:
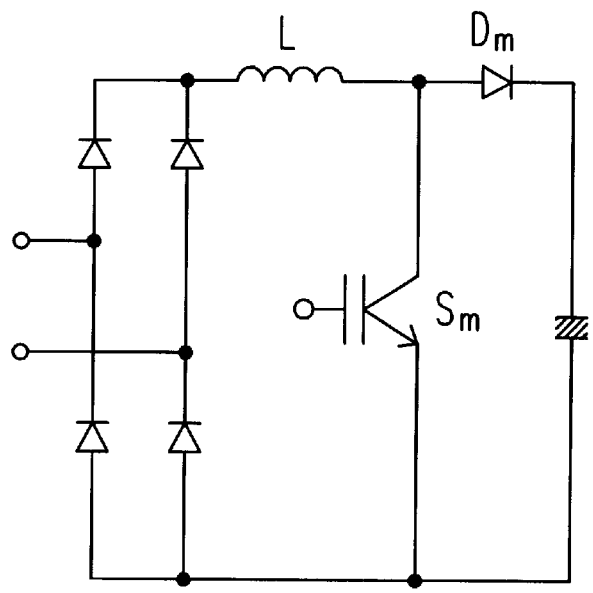
FIG. 1 shows a conventional single-phase boost converter.
Figure 2:
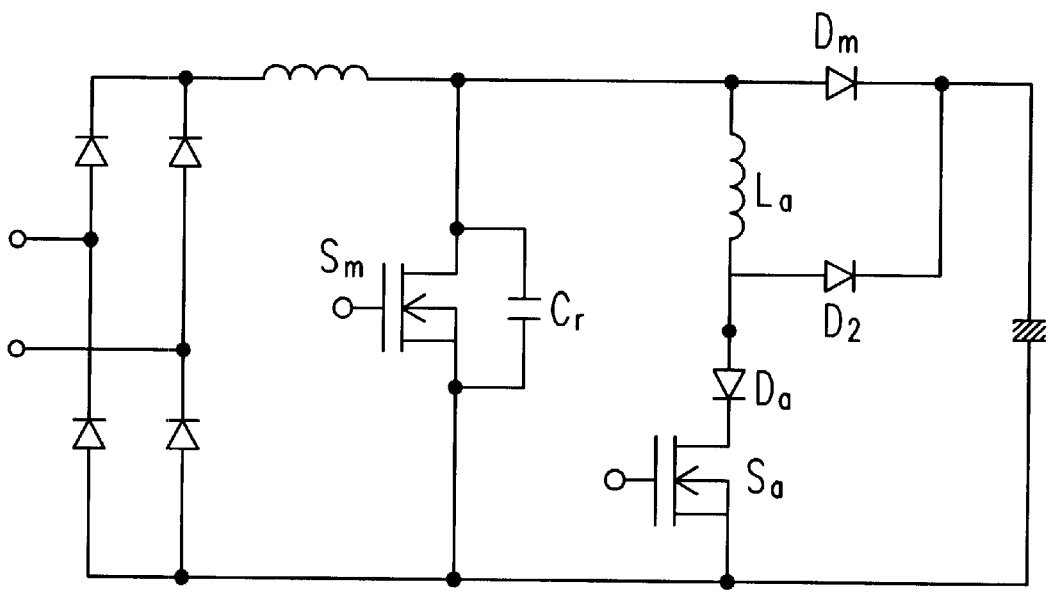
FIG. 2 shows another type of the conventional single-phase boost converter.

Mode 0: This operating mode is operatively identical to the conventional single-phase boost converter of FIG. 2 operating in the discharge mode. In this operating mode, the energy stored in the boost choke L will be discharged to the output capacitor $C_1$ and $C_2$ through the main diode $D_{m1}$ and $D_{m2}$.

Mode 1: The unidirectional switch $S_{a1}$ will turn on under a zero current circumstances, and the current flowing through the resonant inductor $L_r$ will be increased in a linear fashion. As the current flowing through the resonant inductor $L_r$ is increased up to be equal with the output current $I_o$, this operating mode will be terminated.

Mode 2: The resonant capacitor $C_r$ will come into resonance with the resonant inductor $L_r$, which will cause the energy stored in the resonant capacitor $C_r$ to be discharged until approximately zero. This operating mode terminates as the main switch $S_m$ turns on.

Mode 3: When the voltage across the resonant capacitor $C_r$ is approaching zero, the main switch $S_m$ is driven to turn on by detecting if the voltage across the resonant capacitor $C_r$ is approaching zero. This operating mode starts as the main switch $S_m$ turns on, and the electric energy stored in the resonant inductor $L_r$ will be discharged to the second output capacitor $C_2$ through the main switch $S_m$. This operating mode terminates as the electric energy stored in the inductor $L_r$ is fully discharged. Because the switch $S_{a1}$ is a unidirectional switch, even the driving signal for the switch $S_{a1}$ is high, the switch $S_{a1}$ is still turned off, and further it is turned off under a zero current circumstances.

Mode 4: This operating mode starts as the energy stored in the resonant inductor $L_r$ is discharged until zero. This operating mode is operatively identical to the charge mode of the conventional boost converter. This operating mode terminates as the PFC driving signal is deasserted.

Mode 5: This operating mode starts as the main switch $S_m$ turns off, meanwhile the resonant capacitor $C_r$ will be charged by the boost choke L. When the voltage across the resonant capacitor $C_r$ is equal to the output voltage $V_o$, this operating mode will be terminated.

Mode 6: When the voltage across the resonant capacitor $C_r$ is equal to the output voltage $V_o$, it will not go up anymore but will be clamped by the output voltage $V_o$. This operating mode is operatively identical to the operating mode 0.

Mode 7: This operating mode is similar to the operating mode 1, except that the switch to be turned on is the second auxiliary switch $S_{a2}$ instead of the first auxiliary switch $S_{a1}$. As similar to the operating mode 1, the unidirectional switch $S_{a2}$ will turn on under a zero current circumstances, and the current flowing through the resonant inductor $L_r$ will be increased in a linear fashion. As the current flowing through the resonant inductor $L_r$ is increased up to be equal with the output current $I_o$, this operating mode will be terminated.

Mode 8: This operating mode is similar to the operating mode 2. The resonant capacitor $C_r$ will come into resonance with the resonant inductor $L_r$ through the unidirectional switch $S_{a2}$ and the auxiliary diode $Da_2$ to enable the electric energy stored in the resonant capacitor $C_r$ to discharge until zero. This operating mode terminates as the main switch $S_m$ turns on.

Mode 9: This operating mode is similar to the operating mode 3. This operating mode starts by detecting if the voltage across the resonant capacitor $C_r$ is approaching zero to drive the main switch $S_m$ to turn on. In this operating mode, the electric energy stored in the resonant inductor $L_r$ is linearly discharged to the second output capacitor $C_2$ through the main switch $S_m$. This operating mode terminates as the electric energy stored in the inductor $L_r$ is fully discharged. Because the second auxiliary switch $S_{a2}$ is a unidirectional switch, even the driving signal for the switch $S_{a2}$ is high, the switch $S_{a2}$ will automatically turn off, and further it is turned off at a zero current circumstances.

Mode 10: This operating mode starts as the energy stored in the resonant inductor $L_r$ is discharged until zero. This operating mode is operatively identical to the charge mode of the conventional boost converter and the operating mode 4. This operating mode terminates as the PFC driving signal is deasserted, that is, this operating mode terminates as the main switch $S_m$ is turned off. As to the operating mode 11, it is completely identical to the operating mode 5, and it is intended not to give unnecessary details herein.

Figure 6:
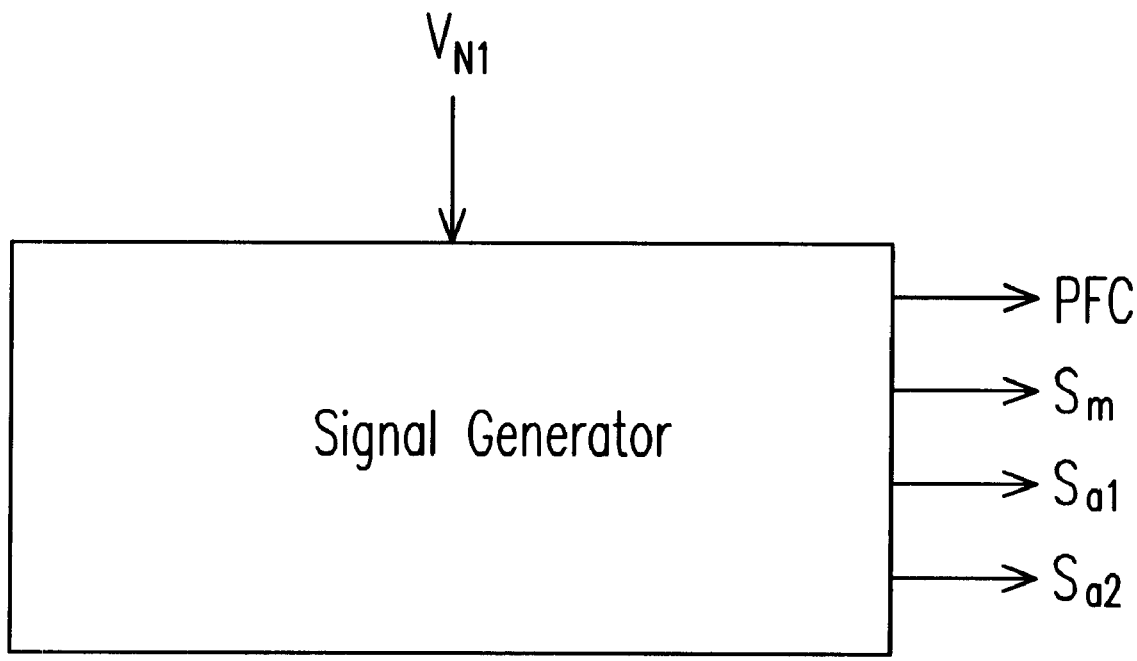
FIG. 6 shows a signal generator for generating all the control signals thereof according to the present invention.

FIG. 6 shows a control signal generator of the present invention. The control signal generator of the present invention is employed to generate the control signals of PFC driving signal (PFC) and the driving signals for the main switch $S_m$, and the auxiliary switches $S_{a1}$ and $S_{a2}$.

To conclude, it is to be known from the above interpretations that according to the present invention the main switch $S_m$ is configured to be driven to turn on or off under a zero voltage circumstances, and both the auxiliary switches $S_{a1}$ and $S_{a2}$ are configured to be driven to turn on or off under a zero current circumstances. Thereby the switching loss incurred herewith can be reduced and the high frequency electromagnetic interference and radio frequency interference can be eliminated. Further, the two auxiliary switches can adopt the switch elements of a miniaturized size, whereby miniaturizing the switch element. Besides, the reverse recovery current problem arising from the diode can be further eliminated.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A boost converter comprising:
    an input coupled to an input inductor;
    a main switch coupled to said input inductor that conducts currents through said input inductor to store energy in said input inductor; and
    a resonant circuit coupled to said main switch for conducting currents from said input to an output of said boost converter, the resonant circuit comprising:
        a first series circuit including a first auxiliary switch and a second auxiliary switch coupled to said main switch;
        a second series circuit including a first output capacitor and a second output capacitor in parallel with said first series circuit; and
        a resonant inductor interposed between said first series circuit and said second series circuit to form a first discharge loop and a second discharge loop to make said main switch turn on and off under a substantial zero voltage;
    wherein both said first auxiliary switch and said second auxiliary switch are turned on and off under a substantial zero current circumstance.

2. The boost converter of claim 1 wherein said first discharge loop comprises said resonant inductor, said second output capacitor and said first auxiliary switch.

3. The boost converter of claim 1 wherein said second discharge loop comprises said second auxiliary switch, said first output capacitor and said resonant inductor.

4. The boost converter of claim 1 wherein both said first auxiliary switch and said second auxiliary switch are uni-directional switches.

5. The boost converter of claim 1 wherein said resonant circuit further comprises a first auxiliary diode and a second auxiliary diode respectively connected with said first auxiliary switch and said second auxiliary switch.

6. The boost converter of claim 2 wherein said first discharge loop further comprises a second main diode.

7. The boost converter of claim 3 wherein said second discharge loop further comprises a first main diode.

* * * * *